United States Patent [19]

Borman et al.

[11] Patent Number: 4,598,129

[45] Date of Patent: Jul. 1, 1986

[54] BLOCK CARBONATE-CARBOXYLATE COPOLYESTERS AND METHOD FOR THEIR PREPARATION

[75] Inventors: Willem F. H. Borman; Richard W. Campbell, both of Evansville, Ind.

[73] Assignee: General Electric Company, Pittsfield, Mass.

[21] Appl. No.: 87,472

[22] Filed: Oct. 23, 1979

[51] Int. Cl.$^4$ ............................................. C08F 20/00
[52] U.S. Cl. ................................................. 525/439
[58] Field of Search ........................................ 525/439

[56] References Cited

U.S. PATENT DOCUMENTS 4,126,592 11/1978 Borman et al. ..................... 525/439
4,169,868 10/1979 Schreckenberg et al. .......... 525/439

FOREIGN PATENT DOCUMENTS 2636783 2/1978 Fed. Rep. of Germany ...... 525/439

*Primary Examiner*—Jacob Ziegler
*Attorney, Agent, or Firm*—Hedman, Gibson, Costigan & Hoare

[57] ABSTRACT

Novel thermoplastic block carbonate-carboxylate copolyesters useful in films and molded articles are prepared by the interesterification of (a) high molecular weight aromatic carbonate polymers and (b) a copolyester of a linear aliphatic dicarboxylic acid and, optionally, an aromatic dibasic acid such as terephthalic or isophthalic acid with one or more straight or branched chain dihydric aliphatic glycols, or with a block copolyester of poly(1,4-butylene terephthalates) and polybutylene oxide or an aromatic/aliphatic polyester, a mixture of poly(1,4-butylene terephthalate) and a polyester of a linear aliphatic dicarboxylic acid and a branched chain dihydric aliphatic glycol or a poly(butylene oxide).

6 Claims, No Drawings

BLOCK CARBONATE-CARBOXYLATE COPOLYESTERS AND METHOD FOR THEIR PREPARATION

This invention relates to novel thermoplastic carbonatecarboxylate copolyesters prepared by the interesterification of (a) straight or branched chain high molecular weight aromatic carbonate polymers and (b) a copolyester of a linear aliphatic dicarboxylic acid and, optionally, aromatic dibasic acids such as isophthalic or terephthalic acid with one or more straight or branched chain dihydric aliphatic glycols, or with a block copolyester of poly(1,4-butylene terephthalates) and polybutylene oxide or an aromatic/aliphatic polyester, a mixture of poly(1,4-butylene terephthalate) and a polyester of a linear aliphatic dicarboxylic acid and a branched chain dihydric aliphatic glycol or a poly(butylene oxide). The compounds are useful as film-forming, extrusion and molding resins, and to enhance the physical properties of other thermoplastic resins.

BACKGROUND OF THE INVENTION

Polycarbonate polymers are excellent molding materials as products made therefrom have high impact strength, toughness, high transparency, wide temperature limits (high impact resistance below −60° C. and a UL thermal endurance rating of 115° C. with impact), good dimensional stability, high creep resistance and electrical properties which qualify it as sole support for current carrying parts.

Goldberg, U.S. Pat. No. 3,169,121, discloses a new class of resins comprising both carbonate and carboxylate groups in their linear chain possessing properties not obtainable in other polycarbonate resins. More specifically, the copolymer compositions of Goldberg, although possessing a wide range of desirable properties, are particularly outstanding in their high temperature strength properties, moldability and improved solvent resistance.

The copolyesters of Goldberg comprise recurring carbonate groups

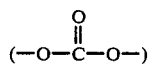

carboxylate groups

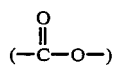

and aromatic carbocyclic groups in the linear polymer chain, in which at least some of the carboxylate groups and at least some of the carbonate groups are bonded directly to ring carbon atoms of the aromatic carbocyclic groups. The copolyesters were prepared by reacting, as essential ingredients, a difunctional carboxylic acid, a dihydric phenol and a carbonate precursor.

It has also been proposed to make carbonate-carboxylate copolyesters by a modification of the technique suggested by Goldberg, and that is to phosgenate a solution of a dihydric phenol and certain low molecular weight polyesters. The products of such a process are random in nature in the sense that blocks of high molecular weight polycarbonates do not form. Moreover, the process itself is not amenable to large scale production and the number of polyester components suitable for use is limited because not all of them are soluble in the reaction solvent for phosgenation.

It has now been discovered that if a high molecular weight aromatic carbonate polymer resin is chemically modified by being segmented in a carbonate-carboxylate copolyester in which the major portion of the repeating units are aromatic polycarbonate blocks and the minor portion of the repeating units are blocks of a polyester or copolyester of a linear aliphatic dicarboxylic acid with one or more straight or branched chain dihydric aliphatic glycols and/or a polyether glycol, and optionally, an aromatic dibasic acid, such as isophthalic or terephthalic acid, then the resulting block carbonate-carboxylate copolyesters will have enhanced tear strength, compared to the aromatic polycarbonate resin itself. The improvement in tear strength and reduced notch sensitivity (in some instances) is achieved with minimal loss of other physical properties.

In particular, if certain aromatic, aliphatic, or partially aliphatic/aromatic, polyesters, or polyethers, are added to a reactor with a high molecular weight aromatic polycarbonate in the presence of a catalyst for ester interchange and heating is commenced under a high vacuum, there is caused a most desirable modification in the properties of the resulting aromatic polycarbonate molding resins.

By way of illustration, poly(neopentyl adipate), having a hydroxyl number in the range of 32 to 38, corresponding to a number average molecular weight of 3000 to 3500, is used as a source of blocks. This polyester is available from Ruco Division of Hooker Chemical Co., under the trade designation, Rucoflex 1016-35. The polyester is added to a reactor containing a reaction product of bisphenol-A and phosgene. A small amount of tetra (2-ethylhexyl)titanate catalyst is added. They are melted together under a slight vacuum. The vacuum is then increased to 0.1 mm Hg. and the temperature to 250° C. After 30–60 minutes, the viscous melt is cooled to produce the product.

After forming the block carbonate-carboxylate copolyesters, alone, or combined with other thermoplastics into thin sheets or filsm, they are improved in tear strength and reduced in notched sensitivity as compared to films and sheets from unmodified aromatic polycarbonate. Other properties are improved as well. Many of the products are well-suited to injection molding and extrusion, as well.

The block carbonate-carboxylate copolyester products can also be converted to valuable modifications by adding reinforcements and/or fillers, such as glass fibers, talc, mica, clay and the like, or other conventional additives, such as flame retardants, pigments, etc.

DESCRIPTION OF THE INVENTION

According to this invention, there are provided novel thermoplastic carbonatecarboxylate copolyesters which consist essentially of blocks derived from:

(a) a high molecular weight aromatic carbonate polymer; and (b)
  (i) a terminally-reactive aromatic/aliphatic copolyester of a dicarboxylic acid selected from the group consisting of terephthalic acid, isophthalic acid, naphthalene dicarboxylic acids, phenyl indane dicarboxylic acid and compounds of the formula:

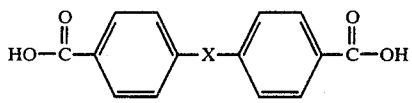

in which X may be alkylene or alkylidene of from 1 to 4 carbon atoms, carbonyl, sulfonyl, oxygen or a bond between the benzene rings, and an aliphatic dicarboxylic acid having from 6 to 12 carbon atoms in the chain and one or more straight or branched chain dihydric aliphatic glycols having from 4 to 10 carbon atoms in the chain, said copolyester having at least 10% of aliphatic units being derived from a dicarboxylic acid;

(ii) a terminally-reactive aliphatic polyester of a straight chain aliphatic dicarboxylic acid having from 4 to 12 carbon atoms in the chain and a straight or branched chain aliphatic glycol;

(iii) a terminally reactive poly(1,4-butylene co-polybutylene oxide terephthalate);

(iv) a copolymer comprising units of poly(1,4-butylene terephthalate and units of an aromatic/aliphatic copolyester as defined in (b)(i) above;

(v) a combination of a terminally reactive polyester of a straight chain aliphatic dicarboxylic acid having from 6 to 12 carbon atoms and a branched chain dihydric aliphatic glycol with a terminally reactive poly(1,4-butylene terephthalate); or (vi) a poly(butylene oxide), said blocks being connected by linkages consisting essentially of carbonate linkages and carboxylate linkages.

It is essential to the invention that the new block copolyesters be prepared by the reaction of high molecular weight aromatic polycarbonates and a terminally reactive copolyester, polyester, or polyether is defined in paragraph (b), in the presence of a catalyst for transesterification, such as zinc acetate, manganese acetate, titanium esters, preferably tetra-(2-ethylhexyl)titanate, and the like. The reactive groups can comprise hydroxyl, carboxyl, carbo-alkoxy, and the like, including reactive derivatives thereof. The result of reaction between two reactive groups, of course, must be a carbonate or a carboxylate linkage. After initial mixing and melting, polymerization is carried out under standard conditions, e.g., 220° to 280° C., in a high vacuum, e.g., 0.1 to 2 mm Hg, to form the block copolymer of minimum randomization in terms of distribution of chain segments.

The copolyester or polyester designated component (b)(i) is preferably prepared from terephthalic acid or isophthalic acid or a reactive derivative thereof and a glycol, which may be a straight or branched chain aliphatic glycol. Illustratively, the glycol will be 1,4-butanediol; 1,5-pentanediol; 1,6-hexanediol; 1,9-nonanediol; 1,10-decanediol; neopentyl glycol, 1,4-cyclohexanediol, 1,4-cyclohexane dimethanol, a mixture of any of the foregoing, or the like. Illustrative of suitable aliphatic dicarboxylic acids for the mixed aromatic/ aliphatic embodiments are suberic, sebacic, azelaic, adipic acids, and the like.

The copolyesters or the polyester designated component (b) may be prepared by ester interchange in accordance with standard procedures. The polyesters designated (b) (i) are most preferably derived from an aliphatic glycol and a mixture of aromatic and aliphatic dibasic acids in which the mole ratio concentration of aromatic to aliphatic acids is from between 1 to 9 and 9 to 1, with an especially preferred range being from about 3 to 7 to about 7 to 3.

The aliphatic polyesters designated component (b) (ii) will contain substantially stoichiometric amounts of the aliphatic diol and the aliphatic dicarboxylic acid, although hydroxy-containing terminal groups are preferred.

In addition to their ease of formation by well-known procedures, both the aromatic/aliphatic copolyesters (b) (i) and the aliphatic polyesters (b) (ii) are commercially available. One source for such materials is the Ruco Division/Hooker Chemical Company, Hicksville, N.Y., U.S.A. which designates its compounds as "Rucoflex". Another source is Emery Industries, Cincinnati, Ohio, which designates its compounds "Plastolein".

The polyesters designated (b) (ii) and (b) (v) can be made by inter-esterification of poly(1,4-butylene terephthalate) and polybutylene oxide or an aromatic/aliphatic copolyester, in conventional ways, e.g., by melting them together in the presence of an interesterification catalyst and heating the melt under a high vacuum. Type (b)(ii) resins are available from DuPont Co. under the tradename Hytrel resins. Component (b)(v) is made by melt blending poly(1,4-butylene terephthalate) and a polyester, such as poly(neopentyl adipate). Type b(vi) resins are made by polymerizing butylene oxide and in known ways, and they are available under the tradename Polymeg.

The block copolyesters of this invention preferably comprise from 95 to 50 parts, and especially preferably from 75 to 50 parts by weight of the segments of aromatic polycarbonate.

The high molecular weight aromatic polycarbonates to be employed herein as component (a) are homopolymers and copolymers and mixtures thereof which have an I.V. of 0.40 to 1.0 dl./g. as measured in methylene chloride at 25° C. These can be prepared by reacting a dihydric phenol with a carbonate precursor. Typical of some of the dihydric phenols that may be employed in the practice of this invention are bisphenol-A, (2,2-bis(4-hydroxyphenol) propane), bis(4-hydroxyphenyl)methane, 2,2-bis(4-hydroxy-3-methylphenyl)-propane, 4,4-bis(4-hydroxyphenyl)heptane, 2,2-(3,5,3',5'-tetrachloro-4,4'-dihydroxydiphenyl)propane, 2,2-(3,5,3',5'-tetra bromo-4,4'-dihydroxydiphenyl)propane, (3,3'-dichloro-4,4'-dihydroxydiphenyl)methane. Other dihydric phenols of the bis-phenol type are also available and are disclosed in U.S. Pat. Nos. 2,299,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also, employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di(chlorophenyl) carbonate, di(bromophenyl) di(trichlorophenyl) carbonate, di-(tribromophenyl) carbonate, etc., di-(alkylphenyl) carbonates such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers used in this invention may be prepared by employing a molecular weight regulator, an acid acceptor and a catalyst. The molecular weight regulators which can be employed in carrying out the process of this invention include monohydric phenols such as phenol, chroman-I, paratetiarybutylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine etc. The inorganic acid acceptor may be one which can be either a hydroxide, a carbonate, a bicarbonate, or a phosphate of an alkali or alkaline earth metal.

The catalysts which are employed to make component (a) can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also contemplated as component (a) are branched polycarbonates wherein a polyfunctional aromatic compound is reacted with the dihydric phenol and carbonate precursor to provide a thermoplastic randomly branched polycarbonate.

Such polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichlorioe, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acids or their haloformyl derivatives.

Also contemplated as component (a) are blends of a linear polycarbonate and a branched polycarbonate.

The block carbonate-carboxylate copolyesters may be employed as such in the fabrication of films, sheets and similar articles, for extrusion and/or molding, or they may be blended with other polymers, such as poly(1,4-butylene terephthalate) straight chain or branched, and with stabilizers reinforcing agents and/or flame retardant additives.

Suitable reinforcing agents and/or fillers are well known but, illustratively, they may be selected from the group consisting of metals, such as aluminum, iron or nickel particles and the like, and non-metals, such as carbon filaments, silicates, such as acicular calcium silicate, asbestos, titanium dioxide, potassium titanate and titanate whiskers, clay, mica, wollastonite, glass flakes and fibers. It is also to be understood that unless the filler adds to the strength and stiffness of the composition, it is only a filler and not a reinforcing filler as contemplated herein.

Molding composition from the new resins of this invention can be prepared by a number of procedures. In one way, any reinforcement, e.g., fillers or fibers, pigments, stabilizers, etc., are put into an extrusion compounder with the resinous components to produce molding pellets. The additives are dispersed in a matrix of the resin in the process. In another procedure, the additive(s) and the resin are dry blended then either fluxed on a mill and communited, or they are extruded and chopped. The additives can also be mixed with the resin(s) and directly molded. e.g., by injection or transfer molding techniques.

The pre-compounded composition can be extruded and cut up into molding compounds such as conventional granules, pellets, etc., by standard techniques.

The composition can be molded in any equipment conventionally used for thermoplastic compositions.

DESCRIPTION OF THE PREFERRED EMBODIMENTS

The following examples illustrate the preparation of certain compositions within the scope of this invention. They are not to be construed to limit the scope of the invention.

EXAMPLES 1-4

A aromatic polycarbonate of bisphenol-A and phosgene is dryblended with a poly(neopentyl adipate) and a tetra(2-ethylhexyl)titanate catalyst and melted under a slight vacuum. Once melted, the vacuum is increased to 0.1 mm Hg. and the temperature is increased to 250° C. After 30-60 minutes, the viscous melt is poured into flat dishes to cool.

EXAMPLE 1

250 g. of bisphenol-A carbonate, General Electric LEXAN 120, intrinsic viscosity, about 0.46 dl./g. is copolymerized with 181 g. of poly(neopentyl adipate), Hooker, Rucoflex 1016-35, Mn=3200-3500 by the above general procedure with 0.2 ml. of titanate catalyst. The polymer is dissolved in methylene chloride and cast into a film. A very tough, flexible elastomeric film is obtained.

EXAMPLE 2

The procedure of Example 1 is repeated, substituting 50 parts of bisphenol-A carbonate and 50 parts of poly(- neopentyl adipate). A rubbery film is obtained which is transparent in thin sections.

EXAMPLE 3

The procedure of Example 1 is repeated, substituting 65 parts of bisphenol-A carbonate and 34 parts of poly(neopentyl adipate). A brittle film is obtained which is transparent in thin sections.

EXAMPLE 4

The procedure or Example 1 is repeated, substituting 74 parts of bisphenol-A carbonate and 26 parts of poly(neopentyl alipate). A slightly brittle film is obtained which is transparent in thin sections.

EXAMPLES 5-6

EXAMPLE 5

An aromatic carbonate of bisphenol-A and phosgene, 45 parts by weight, is blended with poly(neopentyl adipate), 45 parts, and 10 parts by weight of a segmented copolyester of the type sold by DuPont and Co. under the tradename Hytrel 4055 and tetra(2-ethylhexyl)titanate catalyst is added. Reaction is carried out under the procedure set forth in Example 1 to produce a composition according to this invention.

EXAMPLE 6

The procedure o Example 5 is repeated, substituting 57 parts of the aromatic polycarbonate, 10 parts of the poly(neopentyl adipate) and 32 parts of the segmented copolyester. A slightly brittle film is obtained which is transparent in thin sections.

EXAMPLE 7-9

The general procedure of Example 1 is used to prepare a reaction product of bisphenol-A carbonate, an aromatic/aliphatic polyester, Emery Industries' Plastolein 9797U, poly(1,6-hexylene (0.7)azelate (0.3)isophthalate), Mn=3200-3500, and, optionally, two other polymers.

EXAMPLE 7

An aromatic carbonate of bisphenol-A and phosgene, 57 parts, is blended with 43 parts of poly(1,6-hexylene (0.7 azelate (0.3) isophthalate) under the procedure set forth in Example 1. A tacky film is obtained which is transparent in thin sections.

EXAMPLE 8

The procedure of Example 7 is repeated substituting a mixture comprising 57 parts of the bisphenol-A carbonate, 21 parts of the hexylene azelate-co-isophthalate and including 22 parts of a poly(butylene oxide) Mn=2000, Polymeg 2000. An opaque, flexible film is obtained.

EXAMPLE 9

The procedure or Example 1 is repeated, substituting a mixture comprising 50 parts of the bisphenol-A carbonate, 9 parts of the hexylene azelate-co-isophthalate, and including 34 parts of high molecular weight poly(1,4-butylene terephthalate) resin. A soft, flexible film is obtained which is transparent in thin sections.

EXAMPLES 10-14

The general procedure of Example 1 is used to prepare a reaction product of bisphenol-A carbonate, a poly(1,4-butylene-co-polybutylene oxide terephthalate), a poly(butylene oxide) and a cross-linked composition.

EXAMPLE 10

The procedure of Example 1 is repeated substituting a mixture of 50 parts of bisphenol-A carbonate, and 50 parts of a block copolyester comprising predominantly poly(1,4-butylene terephthalate) (VALOX 330, General Electric Company) A somewhat grainy film is obtained which is transparent in thin sections.

EXAMPLE 11

The general procedure of Example 1 is used to prepare a reaction product of 57 parts of bisphenol-A carbonate and 43 parts of poly(butylene oxide), Polymeg 2000, Mn=2000. An opaque, low modulus film is obtained.

EXAMPLE 12

The general procedure of Example 1 is used to prepare a reaction product of 50 parts of bisphenol-A carbonate and 50 parts of poly(1,4-butylene-co-polybutylene oxide terephthalate), DuPont Hytrel resin 1.5 parts of gamma-glycidoxy propyl trimethoxysilane is included as cross-linker. A transparent, cross-linked, very tough film is obtained.

EXAMPLE 13

The procedure of Example 12 is repeated, omitting the silane cross-linker. A transparent film is obtained.

EXAMPLE 14

The procedure of Example 12 is repeated, substituting beta(3,4-epoxy cyclohexyl ethyl trimethoxysilane as the cross-linker. An opaque, cross-linked film is obtained.

The foregoing detailed description has been given for clearness of understanding only and no unnecessary limitations are to be understood therefrom. The invention is not limited to the exact details shown and described, for obvious modifications will occur to those skilled In the art.

We claim:

1. A process for the preparation of a thermoplastic carbonate-carboxylate copolyester which consists essentially of blocks derived from:
   (a) a high molecular weight aromatic carbonate polymer; and
   (b) a terminally-reactive aliphatic polyester of a straight chain aliphatic dicarboxylic acid having from 4 to 12 carbon atoms in the chain and a straight or branched chain aliphatic glycol which comprises heating in the presence of a catalyst for esterification:
   (a) a high molecular weight aromatic carbonate polymer; and
   (b) a terminally-reactive aliphatic polyester of a straight chain aliphatic dicarboxylic acid having from 4 to 12 carbon atoms in the chain and a straight or branched chain aliphatic glycol, until the formation of blocks connected by linkages consisting essentially of carbonate linkages or carboxylate linkages is substantially complete.

2. A process as defined in claim 1 wherein block (a) is a polycarbonate of bisphenol-A and phosgene.

3. A process as defined in claim 1 wherein block (b) is a polyester of a straight chain aliphatic dicarboxylic acid having from 6 to 12 carbon atoms and a branched chain dihydric aliphatic glycol.

4. A process as defined in claim 3 wherein block (b) is a poly (neopentyladipate).

5. A process as defined in claim 1 wherein said catalyst is tetra(2-ethylhexyl)titanate.

6. A process as defined in claim 1 wherein component (a) comprises from 75 to 50% and component (b) comprises from 25 to 50% by weight of the reaction mixture.

* * * * *